(12) United States Patent
Bories

(10) Patent No.: US 12,043,582 B2
(45) Date of Patent: Jul. 23, 2024

(54) PROCESS FOR MARKING A REFRACTORY CERAMIC PART

(71) Applicant: SAINT-GOBAIN CENTRE DE RECHERCHES ET D'ETUDES EUROPEEN, Courbevoie (FR)

(72) Inventor: Olivier Bories, Fontainebleau (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 800 days.

(21) Appl. No.: 17/263,779

(22) PCT Filed: Jul. 26, 2019

(86) PCT No.: PCT/EP2019/070243
§ 371 (c)(1),
(2) Date: Jan. 27, 2021

(87) PCT Pub. No.: WO2020/025497
PCT Pub. Date: Feb. 6, 2020

(65) Prior Publication Data
US 2021/0300830 A1 Sep. 30, 2021

(30) Foreign Application Priority Data
Aug. 1, 2018 (FR) ...................................... 1857213

(51) Int. Cl.
*C04B 41/00* (2006.01)
*C04B 41/80* (2006.01)

(52) U.S. Cl.
CPC ........ *C04B 41/0036* (2013.01); *C04B 41/009* (2013.01); *C04B 41/80* (2013.01)

(58) Field of Classification Search
CPC ... C04B 41/0036; C04B 41/009; C04B 41/80; C03B 5/43
See application file for complete search history.

(56) References Cited

U.S. PATENT DOCUMENTS

| 4,769,310 A | 9/1988 | Gugger et al. |
| 5,030,551 A | 7/1991 | Herren et al. |
| (Continued) | | |

FOREIGN PATENT DOCUMENTS

JP 2005-4175624 B2 11/2008

OTHER PUBLICATIONS

International Search Report corresponding to International Application No. PCT/EP2019/070243 dated Oct. 21, 2019, 5 pages.

*Primary Examiner* — Robert G Bachner
(74) *Attorney, Agent, or Firm* — Ronald M. Kachmarik; Cooper Legal Group LLC

(57) ABSTRACT

A process for marking a surface of a refractory ceramic part, known as the "surface to be marked." The part has a microstructure of grains including more than 50% by mass of $ZrO_2$, bound by a silicate binder phase, and a total porosity of less than 5% by volume. The process involves irradiation of the surface with a laser beam. The beam is emitted by a laser device set to comply with relationship: $a.V^2+b.F^2+c.VF+d.V+e.F+f<0$, in which: $a=10^4$. $D+2\times10^6$, $b=0.5\times10^6$. $D-150\times10^6$, $c=0.5\times10^6$. $D-300\times10^6$, $d=5\times10^3$. $D-2.5\times10^6$, $e=-5\times10^3$. $D+2.0\times10^6$, and $f=-5\times10^9$. $D+1.8\times10^{12}$. V is expressed in mm/second, D is expressed in mm and F is expressed in kHz.

14 Claims, 1 Drawing Sheet

(56) References Cited

U.S. PATENT DOCUMENTS 5,272,120 A 12/1993 Kosuda et al.
5,543,269 A 8/1996 Chatterjee et al.
6,238,847 B1 5/2001 Axtell, III et al.

PROCESS FOR MARKING A REFRACTORY CERAMIC PART

TECHNICAL FIELD

The invention relates to a process for marking a refractory ceramic part, notably intended for a glass furnace or a metallurgical furnace.

PRIOR ART

Dense refractory ceramic parts, which are generally large, may be used at high temperatures, in particular in glass or metal smelting furnaces.

They may notably be produced by electrofusion. This process consists in melting the raw materials in an arc furnace and then in casting the molten material in a mold and in cooling it to solidify it. The "fused" block obtained can then be machined to give it dimensions suitable for the application.

The composition of a refractory ceramic part and the process for manufacturing it are adapted to the region of the furnace for which it is intended.

To ensure the traceability of a part and to be able to identify it during the assembly of the furnace, notably so that it can be placed in a predetermined position, it is necessary to mark it at the manufacturing site.

The mark must be
  contrasted,
  resistant to abrasion during its handling, notably during the assembly operation,
  resistant to temperatures above 600° C., in particular to permit marking of a joint face or of a cold face of the part.

Depending on the application, the mark will or will not need to be erasable.

On the cold face, an indelible mark makes it possible to authenticate and to trace the part after assembly, and even after use of the furnace.

On the other faces, an erasable mark enables modification of the mark during assembly and avoids excessively rapid deterioration, notably with respect to blistering in a glass furnace application.

The marking process must be quick and efficient, with a marking speed of several centimeters per second. Preferably, a surface area of 400 cm² should be able to be marked in one minute.

The marking process should preferably not necessitate preparation of the surface, beyond simple wiping, drying with ambient air after machining under water, or sandblasting in order to reduce the burr or flash observed on raw manufacturing or machining parts.

Finally, the marking should not lead to any change in the formulation of the material, which is always liable to reduce the performance in service.

To mark a part, it is known practice to deposit an ink on its surface. However, inks are not resistant to the working temperature of furnaces and are harmful to the environment.

Laser marking processes are also known. When applied to ceramic parts including grains comprising zirconia, they conventionally lead to color gradations and/or to black marks which impair the legibility of the mark.

U.S. Pat. No. 5,272,120 discloses, for example, a marking process using a YAG or $CO_2$ laser radiation, with a typical power of about 7 to 10 W, with a frequency of 8 kHz and a travel speed of 22 mm/second under an oxygen-depleted atmosphere.

U.S. Pat. No. 5,543,269 proposes a marking process using a multimode Nd:YAG laser radiation. The mark is erasable.

JP 2005-4175624 suggests a marking process using an oscillating laser radiation in simple mode (unlike YAG lasers), notably using a $YVO_4$ laser with a power of 6.5 W and a wavelength of 1064 nm.

U.S. Pat. No. 4,769,310 suggests modifying the composition of ceramic parts to be marked by incorporating therein inorganic pigments that are sensitive to laser radiation. These additions may, however, significantly degrade the performance of the ceramic part in service and contaminate the molten glass bath in the case of a glass furnace application.

U.S. Pat. No. 5,030,551 or U.S. Pat. No. 6,238,847 propose to deposit a layer sensitive to laser radiation onto the surface to be marked. This layer is, however, poorly adherent and sparingly abrasion-resistant.

There is thus a need for a process for marking a dense refractory ceramic part which meets the constraints listed above and which does not have the drawbacks of the known processes.

One aim of the invention is to address this need, at least partially.

SUMMARY OF THE INVENTION

The invention relates to a process for marking a surface of a refractory ceramic part, known as the "surface to be marked", said part, known as the "dense refractory ceramic part", having
  a microstructure comprising, or even consisting of, grains including more than 50% by mass of $ZrO_2$, preferably $ZrO_2$ grains, bound by a silicate binder phase, and
  a total porosity of less than 5% by volume,
said process involving irradiation of said surface with a laser beam, the beam being emitted by a laser device set to comply with relationship (1) below:

$a.V^2+b.F^2+c.VF+d.V+e.F+f<0$, in which:

$$a = 10^4 \cdot D + 2 \times 10^6$$
$$b = 0.5 \times 10^6 \cdot D - 150 \times 10^6$$
$$c = 0.5 \times 10^6 \cdot D - 300 \times 10^6$$
$$d = 5 \times 10^3 \cdot D - 2.5 \times 10^6$$
$$e = -5 \times 10^3 \cdot D + 2.0 \times 10^6$$
$$f = -5 \times 10^9 \cdot D + 1.8 \times 10^{12}$$

V being expressed in mm/second, D being expressed in mm and F being expressed in kHz.

The inventors have found that such a process makes it possible advantageously to perform marking which meets the need expressed previously.

In particular, they have found that the mark has very good contrast and a uniform color, no gradation or black marks being perceptible to the naked eye, even around the periphery of the marked characters or zones.

Without being bound by the theory, the inventors explain this result by the specificities of the laser beam, which removes some of the binder phase and a portion of the grains, but without exposing said grains.

Preferably, the exposure energy is adapted to remove the binder phase over a depth of greater than 10% and/or less than 50%, preferably less than 30%, or even less than 20% of the mean size of the grains of the surface to be marked.

Preferably, a process according to the invention also has one or more of the following optional features:
- the frequency F is less than 300 kHz and/or the speed V is less than 5000 mm/sec;
- the frequency F is less than 100 kHz and/or the speed V is less than 3000 mm/sec;
- to manufacture an erasable mark, the laser device is set so that 800.F/(V.D)<1;
- to improve the legibility, the laser device is set so that 800.F/(V.D)>0.1, preferably 800.F/(V.D)>0.15;
- the exposure energy is adapted to remove the binder phase over a depth of between 5 and 100 μm, preferably less than 75 μm, preferably less than 50 μm;
- before irradiation, the surface to be marked has a roughness Ra, measured according to the standard ISO 4287/1997, of less than 20 μm and/or the refractory ceramic part has a percentage of moisture of less than or equal to 1%;
- the grains include more than 95% by mass of $ZrO_2$;
- the refractory ceramic part is made of a fused material;
- the refractory ceramic part is made of a material consisting, for more than 90% of its mass, of one or more oxides chosen from the group consisting of $ZrO_2$, $Al_2O_3$, $SiO_2$, $Cr_2O_3$, $Y_2O_3$ and $CeO_2$;
- the laser beam has, on the surface to be marked, an equivalent diameter of between 30 and 100 μm;
- the exposure energy is between 5 and 3000 $J/mm^3$.

The invention also relates to a dense refractory ceramic part including a mark, preferably inscribed by means of a marking process according to the invention, the mark defining a cavity
- with a depth of between 5 and 100 μm, preferably less than 75 μm, preferably less than 50 μm, and/or
- from the bottom of which the grains project, on average, by more than 5%, preferably by more than 10% of their mean size, and/or by less than 50%, preferably less than 30%, or even less than 20% of their mean size.

The mark may notably be an alphanumeric character, a line or a dot matrix or a graphic representation.

Preferably, the mark includes a plurality of dots, the dot density being between 100 and 1000 dots per $mm^2$.

The invention also relates to a process for manufacturing a furnace, in particular a glass furnace or a metallurgical furnace, said process including the following steps:
1) manufacturing a plurality of refractory ceramic parts and inscription of a mark on each part according to a marking process according to the invention, the mark inscribed on a part being dependent on an intended position for said part in the furnace;
2) assembling the refractory ceramic parts so that each part is in a position in accordance with the mark inscribed thereon.

The invention also relates to a process for controlling the assembly of refractory parts of a furnace lining, in particular of a glass furnace or of a metallurgical furnace, in which process, after assembling said refractory parts, a mark inscribed on a said refractory part is read and the real location of said part is then compared with a predetermined location identified by means of said mark.

Definitions

The term "refractory ceramic part" means a part made of a nonmetallic inorganic material.

The "hot face" is a face exposed to the interior of the furnace, i.e. in contact with the molten material, for example glass or metal, and/or with the gaseous environment of this material.

The cold face is conventionally the face opposite the hot face. The hot and cold faces of a block are connected together
- via side faces, or "joint faces", facing the side faces of adjacent blocks in the same row of blocks, and
- via upper and lower faces, facing the lower and upper faces of at least one upper block resting on said block and of at least one lower block on which said block rests, respectively.

The thickness of a block is conventionally its smallest dimension. It conventionally measures the distance between the hot face, in contact with the atmosphere of the furnace, and the cold opposite face.

The equivalent diameter of the cross section of a beam is the diameter of a disc having the same area as this cross section.

The term "grain" refers to a crystalline element, having a homogeneous composition or a eutectic composition, and having a size of greater than 10 μm.

The term "crystallite" refers to a crystalline element with a surface area of greater than 0.1 $μm^2$ and less than 10 $μm^2$, the surface areas being measured on an image taken by light microscopy on a section of the product.

The term "grain size" means the half-sum of the overall length and of the overall width of a grain, the length and the width being measured on an image taken by light microscopy on a section of the product, the width being measured in a direction perpendicular to said length.

The term "mean" means an arithmetic mean.

The term "$ZrO_2$ grains" means a grain including more than 80%, preferably more than 90%, preferably more than 95%, preferably more than 98% of $ZrO_2$ as mass percentages on the basis of the oxides.

Unless otherwise indicated, all the percentages relating to the compositions are mass percentages on the basis of the oxides.

The total porosity is conventionally given by the following relationship:

Total porosity=100×(absolute density−apparent density)/absolute density.

The apparent densities are measured according to the standard ISO 5017 on a bar taken from the core of the part, in a healthy zone. The absolute density is measured on ground powder, using a helium pycnometer.

The terms "include", "have" and "comprise" should be interpreted in a broad, nonlimiting manner.

BRIEF DESCRIPTION OF THE FIGURES

Other features and advantages of the invention will emerge more clearly on reading the following detailed description and on examining the appended drawing, in which.

DETAILED DESCRIPTION

Figure 1:
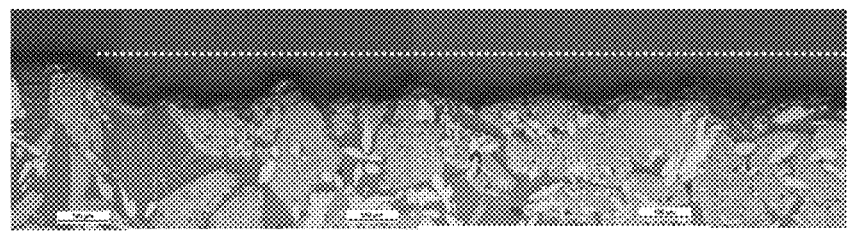
FIG. 1 shows the cross section, on a cut plane perpendicular to the marked surface, of a part according to the invention, marked by laser irradiation.
Figure 2:
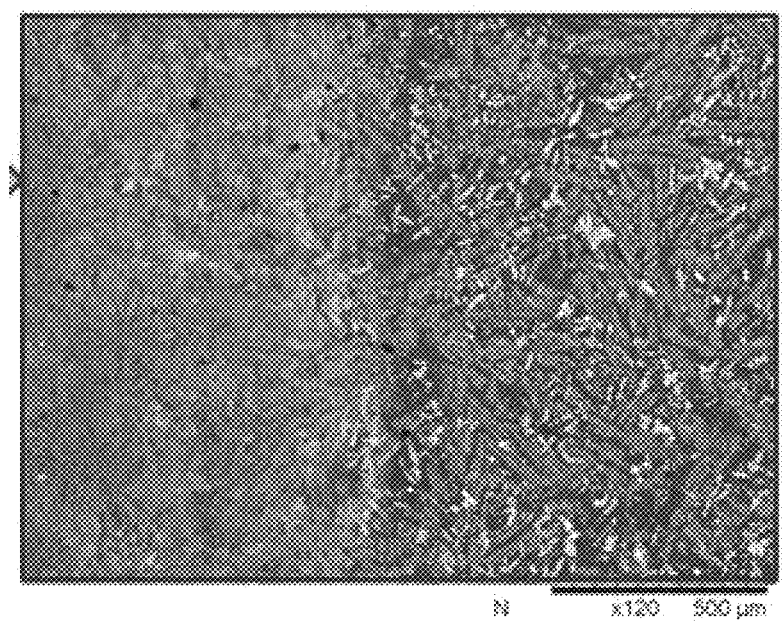
FIG. 2 shows the transition between the marked surface of a refractory ceramic part obtained according to a process according to the invention and an unmarked surface, the marked zone on the left half of the photo having a vitreous appearance and the zone not irradiated with the laser on the right half of the photo revealing the texture of the base product.
Figure 3:
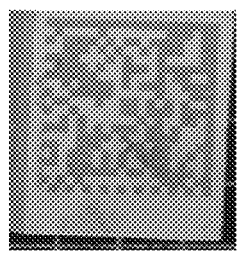
FIG. 3 shows an example of a Datamatrix inscribed on a refractory part according to a process according to the invention, this square mark of about 30 mm by 30 mm consisting of a set of squares with a side length of about 1 mm.

The refractory ceramic part to be marked comprises or preferably consists of a sintered or, preferably, fused material. Its total porosity is preferably less than 5%, preferably less than 3% or preferably less than 1%.

The refractory ceramic part to be marked is preferably obtained by melting a feedstock composed of refractory particles, casting of the liquid bath thus obtained in a mold, and then cooling to solidify the liquid mass in the mold. Preferably, the refractory ceramic part to be marked is obtained by electrofusion, preferably using an arc furnace.

Preferably, the refractory ceramic part has a maximum thickness of greater than 50 mm, or 75 mm, and/or preferably less than 300 mm, less than 200 mm, or even less than 100 mm.

The refractory ceramic part to be marked may in particular be chosen from the group consisting of tank blocks, plate blocks, burner arches or other parts of the superstructure of a glass furnace, preferably tank blocks.

The surface to be marked may be on any face of the refractory ceramic part. Preferably, it is on the hot face or on a side face, or a cold face.

The ceramic part conventionally includes an intergranular binder phase, connecting the crystalline grains.

The crystalline grains include, preferably for more than 80%, more than 90%, more than 95%, or even substantially 100% by volume, $ZrO_2$ grains and, optionally, corundum-zirconia eutectic mixtures.

Preferably, more than 80%, more than 90%, more than 95%, or even substantially 100% of the grains, as mass percentages, are $ZrO_2$ grains.

The zirconia in the refractory ceramic part is present in the form of grains. These monocrystalline or polycrystalline grains comprise the element Zr, and preferably consist of $ZrO_2$ for more than 95%, more than 98%, more than 99% or substantially 100% of their mass.

The mean grain size, in particular on the surface to be marked, is preferably greater than 10 μm, preferably greater than 20 μm, preferably greater than or equal to 30 μm and/or less than 200 μm, preferably less than 100 μm.

The refractory ceramic part preferably consists, for more than 90% of its mass, of one or more oxides chosen from the group consisting of $ZrO_2$, $Al_2O_3$, $SiO_2$, $Cr_2O_3$, $Y_2O_3$ and $CeO_2$. Preferably, $ZrO_2$, $Al_2O_3$ and $SiO_2$ together represent more than 90% of the mass of the refractory ceramic part.

The refractory ceramic part preferably includes more than 15% of $ZrO_2$, and more preferably includes between 26% and 95% of $ZrO_2$.

In various preferred embodiments, the composition of the base product is such that, for a total of more than 90%, more than 95%, or even more than 98%:
$ZrO_2$: 26 to 45%;
$Al_2O_3$: 40 to 60%;
$SiO_2$: 5 to 35%;
or such that
$ZrO_2$: 50 to less than 80%;
$Al_2O_3$: 15 to 30%;
$SiO_2$: 5 to 15%;
or such that
$ZrO_2$: 80 to 98%;
$Al_2O_3$: 5 to 20%;
$SiO_2$: 1 to 12%;
or such that
$10\% < ZrO_2 \leq 25\%$;
$50\% < Al_2O_3 < 75\%$;
$5\% < SiO_2 < 35\%$.

Preferably, in particular for all these embodiments, the mass content of $Na_2O$ and $B_2O_3$ is less than 2%, as a mass percentage on the basis of the oxides of the base product.

The binder phase includes, and preferably consists of, one or more vitreous or vitroceramic phases. It preferably represents between 5% and 50%, preferably between 10% and 40% by mass of the refractory ceramic part.

Preferably, the binder phase is a silicate phase, the mass proportion of $Na_2O$ of which is preferably less than 20%, preferably less than 10% and/or the mass proportion of $Al_2O_3$ of which is less than 30%.

To mark the surface of the refractory ceramic part, a predetermined amount of energy is concentrated on a small surface area, for a predetermined time.

Preparation

Before projecting the laser beam, the refractory ceramic part to be marked is prepared.

Preferably, the refractory ceramic part to be marked is ground down so that the surface to be marked is flat. Preferably, the planarity of this surface, or "camber", measured using a micrometric feeler gauge, preferably on a representative length of at least 10 cm, is less than 100 μm, preferably less than 50 μm.

The roughness of the surface to be marked is preferably such that the roughness Ra, measured according to the standard ISO 4287/1997, is less than 20 μm, preferably less than 15 μm, more preferably less than 10 μm over a reference length of 100 microns. Thus, for example, on materials of AZS type, the variation of z (troughs and peaks) measured with the feeler gauge on a profile of 150 microns is +30/−30 micrometers, preferably +20/−20 micrometers.

Preferably, the part to be marked is dried so that its percentage of moisture is less than or equal to 1%, preferably less than 0.5%.

Irradiation

The device emitting the laser beam may be a conventional laser device, preferably of the $CO_2$ type, preferably with a wavelength of 1065±5 nm, preferably with a mean laser beam power (or "mean output power") of between 10 W and 100 watts, preferably between 20 W and 60 W.

This device may comprise a targeting device which aids in positioning the laser beam and/or a graphic interface for importing an image, for example in JPEG format, representing a symbol or a trademark or a two-dimensional code to be reproduced on the refractory ceramic part.

The device is set so as to irradiate the surface to be marked using a laser incident beam so as to transmit to this surface an exposure energy preferably greater than 5 $J/mm^3$, preferably greater than 7 $J/mm^3$, preferably greater than 10 $J/mm^3$, preferably greater than 20 $J/mm^3$, or even greater than 30 $J/mm^3$ and/or less than 2000 $J/mm^3$, preferably less than 1500 $J/mm^3$, preferably less than 1000 $J/mm^3$, preferably less than 500 $J/mm^3$.

The exposure energy is the ratio between the power per unit area of the beam and the travel speed of the incident beam over the surface to be marked.

The power per unit area is the ratio of the power, in watts, of the incident beam divided by the surface area, in mm², of the cross section of the incident beam when it meets the surface to be marked.

The cross section of the incident beam may be of varied shape, for example of circular cross section.

The equivalent diameter of the cross section of the incident beam, when it meets the surface to be marked, or "radiation width", is preferably greater than 10 µm, preferably greater than 30 µm, preferably greater than 35 µm, and/or less than 100 µm, preferably less than 55 µm. Such an equivalent diameter is particularly suitable for marking a refractory ceramic part which has ceramic grains bound by a vitreous or vitroceramic phase.

Preferably, the beam width is adapted as a function of the mean size of the ZrO₂ grains present at the surface of the base product. Preferably, the larger the mean grain size, the larger the beam width. Preferably, the beam width is between 0.5 and 2 times the mean size of the ZrO₂ grains.

The power per unit area of the incident beam is greater than 1000 W/mm², preferably greater than 5000 W/mm², preferably greater than 7000 W/mm², preferably greater than 10 000 W/mm², and/or preferably less than 100 000 W/mm², preferably less than 50 000 W/mm², preferably less than 30 000 W/mm².

The energy supplied to the surface to be marked must be supplied so as to limit the depth to which the binder phase is removed.

The device used is a pulsed laser, the pulse frequency "F" preferably being greater than 10 kHz, preferably greater than 20 kHz, and/or less than 300 kHz, preferably less than 200 kHz, preferably less than 100 kHz.

The combination of the pulsing and of the travel of the beam advantageously makes it possible to create a mark consisting of a plurality of dots, each dot resulting from the action of a pulse on the surface to be marked.

Preferably, the dot density is between 100 and 1000 dots/mm².

A mark is a visual indication which has a meaning for a person or a machine, for example an alphanumeric character, or a two-dimensional code, for example a dot matrix (for example a Datamatrix or a QR code) or a graphic representation, for example a symbol or a drawing. Preferably, the mark is a code that is readable by a Datalogic matrix 210 Datamatrix reader sold by the company Trumpf or by an in-sight 7210 camera sold by the company 7tech, equipped with a sensor having a resolution of 600×800 pixels.

Preferably, the mark consists of one or more groups of said dots. Preferably, a mark, notably when it represents an alphanumeric character or a code, has a largest dimension of between 1 and 5 cm.

The surface area of all of the marks on the refractory ceramic part, or "marking field", for example the surface area over which a plurality of alphanumeric characters extends, is preferably greater than 100 cm² and/or less than 1000 cm², preferably less than or equal to 200 cm². The marking field may be, for example, a square with a side length of 30 cm.

The marking field may comprise a set of alphanumeric characters, for example a sequence of 5 to 15 figures, each preferably having a height of from 1 to 5 cm. These characters are preferably obtained by a sequence of dots, with a density of from 100 to 1000 dots/mm².

The linear travel speed "V" of the incident beam on the surface of the refractory ceramic part, in mm/s, is preferably greater than 30 mm/s, greater than 40 mm/s, preferably greater than 50 mm/s, and/or less than 3000 mm/s, preferably less than 2000 mm/s, preferably less than 1500 mm/s, preferably less than 1000 mm/s.

An incident beam is conventionally obtained by focusing a primary beam.

The shorter the focal distance "D", the higher the power per unit area.

The focal distance D is preferably between 50 and 500 mm, preferably between 100 and 450 mm, preferably between 150 and 400 mm. Such a focal distance is advantageously compatible with the equivalent diameters described above, and in particular with an equivalent diameter of between 10 and 100 µm.

The inventors have discovered that it is particularly advantageous for the setting of the laser device to comply with the following relationship (1): $a.V^2+b.F^2+c.VF+d.V+e.F+f<0$, in which:

$$a = 10^4 \cdot D + 2 \times 10^6$$

$$b = 0.5 \times 10^6 \cdot D - 150 \times 10^6$$

$$c = 0.5 \times 10^6 \cdot D - 300 \times 10^6$$

$$d = 5 \times 10^3 \cdot D - 2.5 \times 10^6$$

$$e = -5 \times 10^3 \cdot D + 2.0 \times 10^6$$

$$f = -5 \times 10^9 \cdot D + 1.8 \times 10^{12}$$

V being expressed in mm/second, D being expressed in mm and F being expressed in kHz.

In one embodiment, F/V is greater than D/800. The mark is then very heat-resistant, and in particular is still legible after the refractory ceramic part has undergone a heat treatment at 800° C. in air for 24 hours.

In one embodiment, F/V is less than D/800. The vitreous phase is then removed by the laser beam over a depth typically less than 20% of the mean size of the grains of the refractory ceramic part. The mark remains legible and sufficiently contrasted but does not affect the abrasion resistance of the refractory ceramic part. However, it is erasable after a heat treatment at 800° C. in air for 24 hours.

Preferably, the leak tightness of the radiation is conventionally ensured by a dome isolating the surface to be marked, a positive pressure of air being maintained in the dome.

The marking process increases the roughness of the surface of the refractory ceramic part, by creating cavities between the ZrO₂ grains. The depth of these cavities is, however, less than the mean size of these grains. In the case of material of AZS type, for example, the roughness of the marked surface is such that the Ra measured according to the standard is typically between 5 and 50 µm. The variation of z measured with a feeler gauge on a profile 800 microns in length is on average about +5/−20 micrometers, troughs of from 10 to 100 µm being formed over a length of about a hundred micrometers. Such a surface profile appears to constitute a signature of a process according to the invention.

Examples

The examples that follow are provided for illustrative purposes and do not limit the invention.

Dry blocks, with dimensions of 500 mm×600 mm×75 mm, made of a fused product ER1681, sold by the company Zefpro (32% ZrO₂, 51% Al₂O₃, 15% SiO₂) were marked in air, using an ytterbium-doped YAG source class IV LASER Solution F-30 fiber laser, with a wavelength of 1064 nm, a mean output power of 30 W, and the beam of which, of circular cross section, has a diameter of about 50 microns. Two focal distances of 160 mm and 330 mm were used. The functioning of the laser was managed by a control unit directly connected to the fiber laser.

The total porosity of the fused product ER1681 is 2.5%.

The fused product ER1681 has a conventional microstructure of AZS fused products, i.e. $ZrO_2$ grains bound by a silicate binder phase.

For the marking, each block is placed on a face with dimensions of 500 mm×600 mm, and the laser beam is moved along the opposite face. The block is then observed.

To observe whether a mark is erasable, the marked part is subjected to firing in air at 800° C. for 24 hours, and it is observed whether the mark has been erased.

Table 1 shows the results of these observations.

The fused product ER1681 has a conventional microstructure of AZS fused products, i.e. $ZrO_2$ grains bound by a silicate binder phase.

TABLE 1

| | Example | | | | | |
|---|---|---|---|---|---|---|
| | 1a | 1a* | 1b* | 1c | 1d | 2a |
| Focal distance D, in mm | 160 | 160 | 160 | 160 | 160 | 330 |
| Laser pulse frequency F, in kHz | 70 | 30 | 70 | 30 | 70 | 30 |
| Travel speed V, in mm/sec | 50 | 50 | 300 | 300 | 1000 | 60 |
| Beam power per unit area P, in $W/mm^2$ | 15 000 | 15 000 | 15 000 | 15 000 | 15 000 | 15 000 |
| Exposure energy (P/V) | 300 | 300 | 50 | 50 | 15 | 250 |
| a | 3.6E+06 | 3.6E+06 | 3.6E+06 | 3.6E+06 | 3.6E+06 | 5.3E+06 |
| b | −7.0E+07 | −7.0E+07 | −7.0E+07 | −7.0E+07 | −7.0E+07 | 1.5E+07 |
| c | −2.2E+08 | −2.2E+08 | −2.2E+08 | −2.2E+08 | −2.2E+08 | −1.4E+08 |
| d | −1.7E+06 | −1.7E+06 | −1.7E+06 | −1.7E+06 | −1.7E+06 | −8.5E+05 |
| e | 1.2E+06 | 1.2E+06 | 1.2E+06 | 1.2E+06 | 1.2E+06 | 3.5E+05 |
| f | 1.0E+12 | 1.0E+12 | 1.0E+12 | 1.0E+12 | 1.0E+12 | 1.5E+11 |
| (1) $a.V^2 + b.F^2 + c.VF + d.V + e.F + f =$ | −1.0E+11 | 6.2E+11 | −3.6E+12 | −7.2E+11 | −1.1E+13 | −6.0E+10 |
| Relationship complied with if (1) < 0 | yes | no | yes | yes | yes | yes |
| 800 * F/(V * D) = | 7.0 | | 1.2 | 0.5 | 0.4 | 1.2 |
| Mean roughness (μm) R | 50 | 90 | 30 | 20 | 10 | 50 |
| Mean roughness (μm) R max | | | | | | |
| Legibility of the mark | High | Low | High | High | High | High |
| Erasable mark? | no | no | no | yes | yes | no |
| Superficial destruction of the material | no | yes | no | no | no | no |

| | Example | | | | | | |
|---|---|---|---|---|---|---|---|
| | 2a* | 2b | 2b* | 2c | 2d | 3 | 4 |
| Focal distance D, in mm | 330 | 330 | 330 | 330 | 330 | 160 | 160 |
| Laser pulse frequency F, in kHz | 30 | 70 | 70 | 30 | 70 | 50 | 50 |
| Travel speed V, in mm/sec | 1 | 60 | 3000 | 300 | 300 | 100 | 300 |
| Beam power per unit area P, in $W/mm^2$ | 15 000 | 15 000 | 15 000 | 15 000 | 15 000 | 15 000 | 15 000 |
| Exposure energy (P/V) | 15 000 | 250 | 5 | 50 | 50 | 150 | 50 |
| a | 5.3E+06 | 5.3E+06 | 5.3E+06 | 5.3E+06 | 5.3E+06 | 3.6E+06 | 3.6E+06 |
| b | 1.5E+07 | 1.5E+07 | 1.5E+07 | 1.5E+07 | 1.5E+07 | −7.0E+07 | −7.0E+07 |
| c | −1.4E+08 | −1.4E+08 | −1.4E+08 | −1.4E+08 | −1.4E+08 | −2.2E+08 | −2.2E+08 |
| d | −8.5E+05 | −8.5E+05 | −8.5E+05 | −8.5E+05 | −8.5E+05 | −1.7E+06 | −1.7E+06 |
| e | 3.5E+05 | 3.5E+05 | 3.5E+05 | 3.5E+05 | 3.5E+05 | 1.2E+06 | 1.2E+06 |
| f | 1.5E+11 | 1.5E+11 | 1.5E+11 | 1.5E+11 | 1.5E+11 | 1.0E+12 | 1.0E+12 |
| (1) $a.V^2 + b.F^2 + c.VF + d.V + e.F + f =$ | 1.6E+10 | −3.2E+11 | 2.0E+13 | −5.7E+11 | −2.1E+12 | −2.4E+11 | −2.2E+12 |
| Relationship complied with if (1) < 0 | no | yes | no | yes | yes | yes | yes |
| 800 * F/(V * D) = | 72.7 | 2.8 | 0.1 | 0.2 | 0.6 | 2.5 | 0.8 |
| Mean roughness (μm) R | 90 | 30 | 1 | 10 | 8 | | |
| Mean roughness (μm) R max | | | | 75 | | | |
| Legibility of the mark | Low | High | Low | High | High | High | High |
| Erasable mark? | no | no | no | yes | yes | no | yes |
| Superficial destruction of the material | yes | no | no | no | no | no | no |

*outside the invention

The examples according to the invention show that if the variables F and V are chosen so that the relationship (1) is complied with, the mark has a uniform color, with no gradation, and a contrast which ensures very good legibility.

Comparative example 1a*, performed with a lower pulse frequency than that of example 1a according to the invention, has an indelible but poorly legible contrasted marking. The mean roughness of the marked surface is higher.

The travel speed of comparative examples 2a* and 2b* was significantly modified relative to examples 2a and 2b according to the invention, respectively. The legibility of the mark is thereby considerably degraded.

Comparison of examples 1c and 1b shows that the reduction of the pulse frequency F enables the mark to be made erasable after heat treatment at 800° C. for 24 hours.

Examples 3 and 4 according to the invention show that, at a constant frequency, the mark can become erasable (for a product according to the invention) by changing the travel speed of the laser beam along the surface of the refractory block to be marked.

The satisfactory behavior with respect to blistering of the parts marked according to the invention was observed in a conventional blistering test with soda-lime glass at 1100° C. for 30 hours. The parts marked according to a marking process according to the invention are thus suitable for use in a lining of a glass smelting furnace.

As is now clearly apparent, the invention provides a marking process that is easy to perform, which does not modify the properties of the refractory ceramic part, and which makes it possible to obtain a mark that is suitable for the refractory ceramic parts of metallurgical or glass furnaces.

Needless to say, the invention is not limited to the embodiments described, which are provided as nonlimiting illustrations.

The invention claimed is:

1. A process for marking a surface of a refractory ceramic part, known as the "surface to be marked", said part having
   a microstructure comprising grains each including more than 50% by mass of $ZrO_2$, bound by a silicate binder phase,
   a total porosity of less than 5% by volume,
said process involving irradiation of said surface with a laser beam, the beam being emitted by a laser device set to comply with relationship below:

$a.V^2 + b.F^2 + c.VF + d.V + e.F + f < 0$, in which:

$$a = 10^4 \cdot D + 2 \times 10^6$$
$$b = 0.5 \times 10^6 \cdot D - 150 \times 10^6$$
$$c = 0.5 \times 10^6 \cdot D - 300 \times 10^6$$
$$d = 5 \times 10^3 \cdot D - 2.5 \times 10^6$$
$$e = -5 \times 10^3 \cdot D + 2.0 \times 10^6$$
$$f = -5 \times 10^9 \cdot D + 1.8 \times 10^{12}$$

V being expressed in mm/second, D being expressed in mm and F being expressed in kHz.

2. The process as claimed in claim 1, in which the frequency F is less than 300 kHz and/or the speed V is less than 5000 mm/sec.

3. The process as claimed in claim 2, in which the frequency F is less than 100 KHz and/or the speed V is less than 3000 mm/sec.

4. The process as claimed in claim 1, in which, to make the mark erasable, $F/V < D/800$.

5. The process as claimed in claim 1, in which the exposure energy is adapted to remove the binder phase over a depth of between 5 and 100 μm and/or to remove the binder phase over a depth of greater than 10% and less than 50% of the mean size of the grains of the surface to be marked.

6. The process as claimed in claim 1, in which, before irradiation, the surface to be marked has a roughness Ra, measured according to the standard ISO 4287/1997, of less than 20 μm and/or the refractory ceramic part has a percentage of moisture of less than or equal to 1%.

7. The process as claimed in claim 1, in which the grains include more than 95% of $ZrO_2$, as a mass percentage on the basis of the oxides.

8. The process as claimed in claim 1, in which the refractory ceramic part is made of a fused material.

9. The process as claimed in claim 1, in which the refractory ceramic part is made of a material consisting, for more than 90% of its mass, of one or more oxides chosen from the group consisting of $ZrO_2$, $Al_2O_3$, $SiO_2$, $Cr_2O_3$, $Y_2O_3$ and $CeO_2$.

10. The process as claimed in claim 1, in which the equivalent diameter of the cross section of the beam when it meets the surface to be marked is greater than 30 μm and less than 100 μm.

11. A process for manufacturing a furnace, in particular a glass furnace or a metallurgical furnace, said process including the following steps:
   1) Manufacturing a plurality of refractory ceramic parts and inscription of a mark on each part in accordance with a marking process as claimed in claim 1, the mark inscribed on a part being dependent on an intended position for said part in the furnace;
   2) Assembling the refractory ceramic parts so that each part is in a position in accordance with the mark inscribed thereon.

12. A refractory ceramic part having
   a microstructure consisting of grains including more than 50% by mass of $ZrO_2$, bound by a silicate binder phase,
   a total porosity of less than 5% by volume,
said refractory ceramic part including a mark, inscribed by means of a marking process involving irradiation of a surface of said refractory ceramic part with a laser beam, the beam being emitted by a laser device set to comply with relationship below:

$a.V^2 + b.F^2 + c.VF + d.V + e.F + f < 0$, in which:

$$a = 10^4 \cdot D + 2 \times 10^6$$
$$b = 0.5 \times 10^6 \cdot D - 150 \times 10^6$$
$$c = 0.5 \times 10^6 \cdot D - 300 \times 10^6$$
$$d = 5 \times 10^3 \cdot D - 2.5 \times 10^6$$
$$e = -5 \times 10^3 \cdot D + 2.0 \times 10^6$$
$$f = -5 \times 10^9 \cdot D + 1.8 \times 10^{12}$$

V being expressed in mm/second, D being expressed in mm and F being expressed in kHz, the mark defining a cavity
   with a depth of between 5 μm and 100 μm, and/or
   from the bottom of which the grains project, on average, by more than 5% and less than 50% of their mean size.

13. The refractory ceramic part as claimed in claim 12, in which the mark includes a plurality of dots, the dot density being between 100 and 1000 dots per $mm^2$.

14. The refractory ceramic part as claimed in claim 12, in which the mark is an alphanumeric character, a line or a dot matrix or a graphic representation.

\* \* \* \* \*